United States Patent
Zhao et al.

(10) Patent No.: US 10,433,107 B1
(45) Date of Patent: Oct. 1, 2019

(54) SYSTEM AND METHOD FOR ENABLING POLYGON GEOFENCE SERVICES ON MOBILE DEVICES

(71) Applicant: Futurewei Technologies, Inc., Plano, TX (US)

(72) Inventors: Yiwei Zhao, San Jose, CA (US); Jun Yang, Milpitas, CA (US); Shuo Huang, Los Gatos, CA (US); Baopu Li, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/987,319

(22) Filed: May 23, 2018

(51) Int. Cl.
*H04W 4/021* (2018.01)

(52) U.S. Cl.
CPC .................................. *H04W 4/021* (2013.01)

(58) Field of Classification Search
CPC ....... H04W 4/021; H04W 4/04; H04W 4/043; H04W 4/046; H04W 4/023; H04W 4/029
See application file for complete search history.

(56) References Cited

U.S. PATENT DOCUMENTS

| 9,408,031 | B1* | 8/2016 | Steger | H04W 4/021 |
|---|---|---|---|---|
| 9,924,311 | B2* | 3/2018 | Steger | H04W 4/021 |
| 2003/0171132 | A1* | 9/2003 | Ho | H04W 16/06 |
| | | | | 455/522 |
| 2004/0192336 | A1* | 9/2004 | Walby | H04W 48/18 |
| | | | | 455/456.1 |
| 2005/0049021 | A1* | 3/2005 | Nedelcu | H04W 36/32 |
| | | | | 455/575.9 |
| 2010/0127919 | A1* | 5/2010 | Curran | G01S 19/40 |
| | | | | 340/573.4 |
| 2011/0178811 | A1* | 7/2011 | Sheridan | G01C 21/362 |
| | | | | 705/1.1 |
| 2011/0212681 | A1* | 9/2011 | Yamamoto | H04B 7/2041 |
| | | | | 455/3.01 |

(Continued)

FOREIGN PATENT DOCUMENTS

| CN | 105828292 | 8/2016 |
|---|---|---|
| CN | 106068656 A | 11/2016 |

OTHER PUBLICATIONS

Gautam K. Das, Sandip Das, Subhas C. Nandy, Bhabani P. Sinha, Efficient algorithm for placing a given number of base stations to cover a convex region, Science Direct/J. Parellel Distrib. Comput. 66 (2006), 1353-1358, Jul. 7 2006 (Year: 2006).*

(Continued)

*Primary Examiner* — Matthew C Sams
(74) *Attorney, Agent, or Firm* — Vierra Magen Marcus LLP

(57) ABSTRACT

The disclosure relates to technology for location-based services, and in particular, to geofencing. A computing device generates multiple circular shaped geofences to cover a geographic region defined by a polygon shaped geofence. The multiple circular shaped geofences are monitored to detect a current location of user equipment entering a boundary of any of the circular shaped geofences. Based on the detection, determining that the current location of the user equipment is within the polygon shaped geofence. A location based service is notified that the user equipment has entered the polygon shaped geofence.

16 Claims, 10 Drawing Sheets

(56) References Cited

U.S. PATENT DOCUMENTS

| | | | |
|---|---|---|---|
| 2012/0008526 A1* | 1/2012 | Borghei | H04W 4/021 370/254 |
| 2013/0295955 A1* | 11/2013 | Sheshadri | G01S 19/34 455/456.1 |
| 2013/0310053 A1* | 11/2013 | Srivastava | H04W 4/021 455/446 |
| 2014/0066090 A1* | 3/2014 | Henderson | H04W 4/021 455/456.1 |
| 2015/0031388 A1* | 1/2015 | Chatterjee | H04W 4/021 455/456.1 |
| 2015/0057012 A1* | 2/2015 | Hong | H04W 4/022 455/456.1 |
| 2015/0230054 A1 | 8/2015 | Myllymaki et al. | |
| 2015/0281889 A1* | 10/2015 | Menendez | H04W 4/021 455/456.1 |
| 2015/0341816 A1* | 11/2015 | Lee | H04L 5/0092 370/252 |
| 2016/0267093 A1* | 9/2016 | Jimenez | G06F 16/9537 |
| 2017/0086020 A1 | 3/2017 | Zhao et al. | |
| 2017/0325063 A1 | 11/2017 | Curry et al. | |

OTHER PUBLICATIONS

International Search Report dated Aug. 1, 2019, in PCT Patent Application No. PCT/CN20191084710, 9 pages.

* cited by examiner

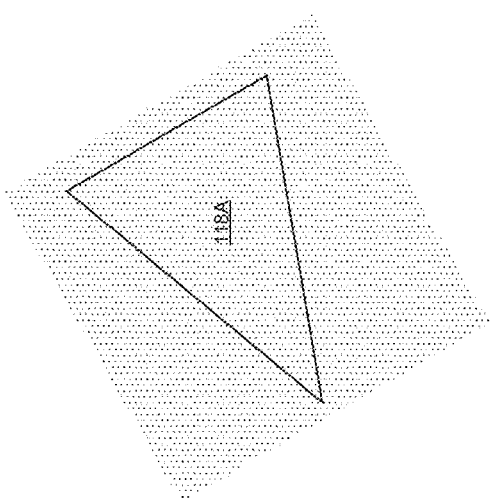
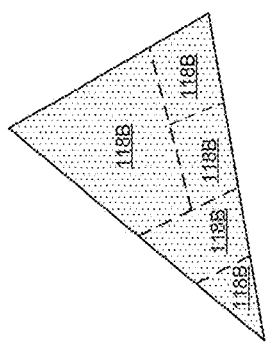
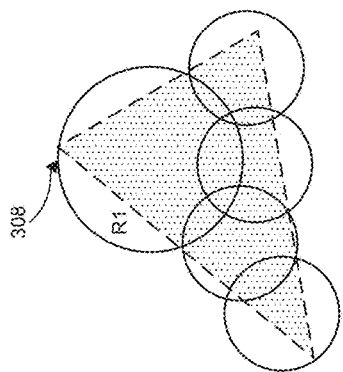
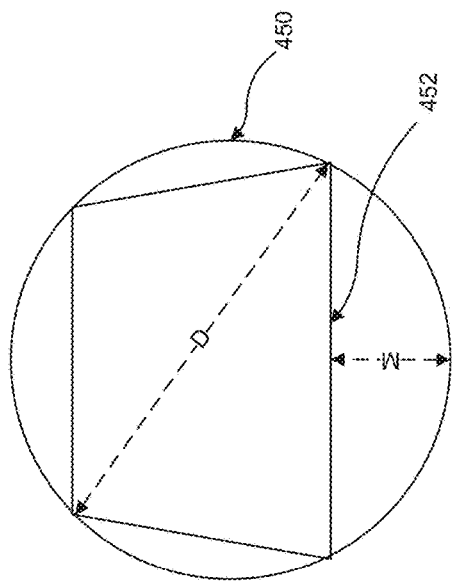
FIG. 4B
FIG. 4C

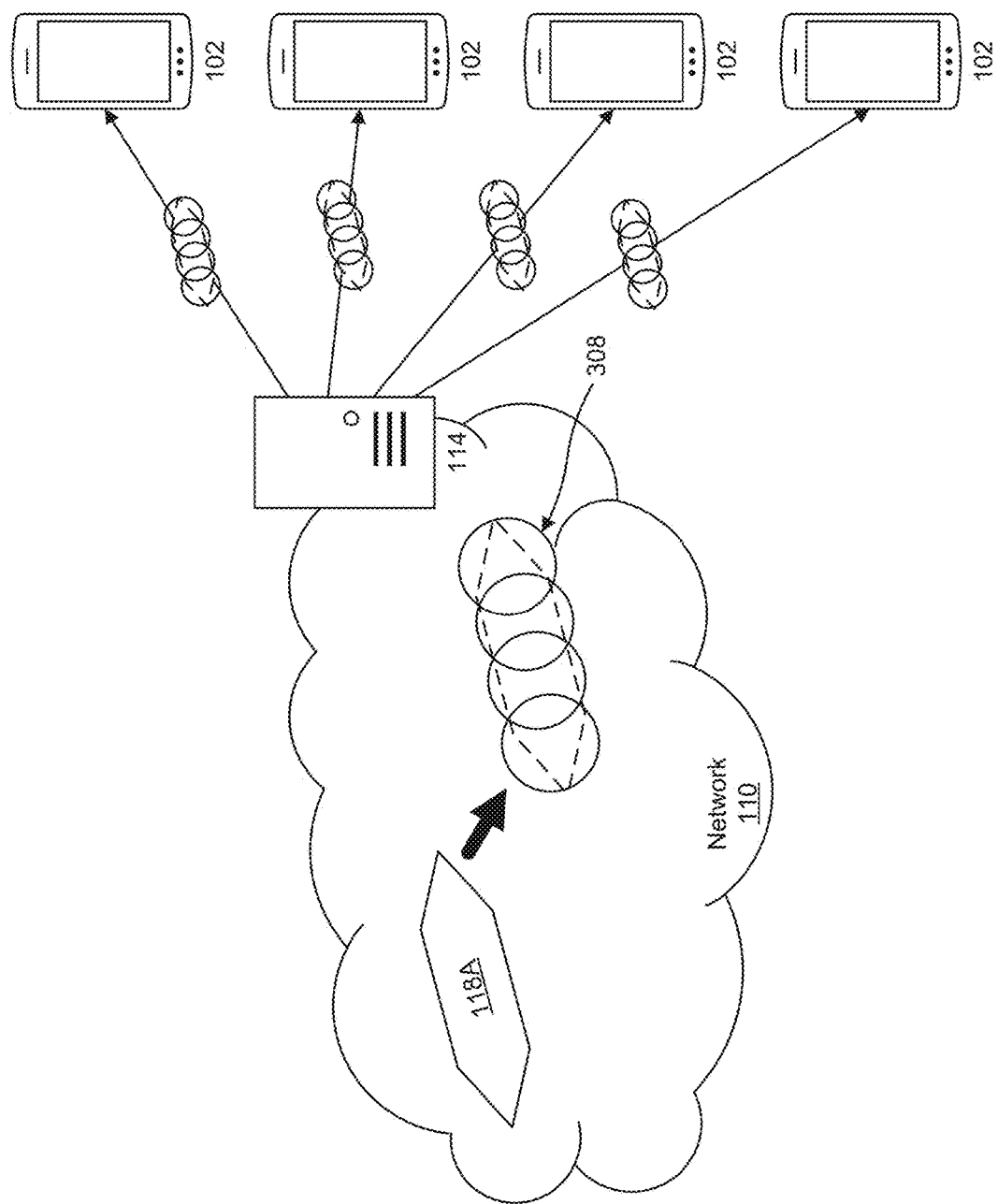

SYSTEM AND METHOD FOR ENABLING POLYGON GEOFENCE SERVICES ON MOBILE DEVICES

FIELD

The disclosure generally relates to location-based services, and in particular, to geofencing.

BACKGROUND

Location data from a computing device, such as a mobile device or phone, can be used for numerous applications. Many applications use location data to locate friends, play games, and assist a user with directions. The location data can also be used to provide an alert on a user's mobile device when the user is the vicinity of a point of interest, such as a business, an institution, landmark, park, or other location that would be of interest to a user. For example, a user may choose to be alerted every time the user is near a particular store or restaurant.

Location-based services are a field of mobile applications that leverage the ability of many mobile devices to determine their current location and perform actions based on that location. In some instances, location-based services utilize geo-fences. A geo-fence is a virtual perimeter that may be established around a real-world geographic area. Entering or crossing a geofence may cause a service to be provided, cause a service to be withheld, or trigger some other sort of action, depending on the particular application. However, shortcomings exist in the current implementation of geofences on many mobile devices. One such shortcoming involves the restrictions on the shape and/or size of geofences that the mobile device may monitor.

BRIEF SUMMARY

According to one aspect of the present disclosure, there is provided a computer-implemented method for geofencing, including generating, by a computing device, multiple circular shaped geofences to cover a geographic region defined by a polygon shaped geofence; monitoring, by the computing device, the multiple circular shaped geofences to detect a current location of user equipment entering a boundary of any of the circular shaped geofences; determining, by the computing device and based on the detection, that the current location of the user equipment is within the polygon shaped geofence; and notifying a location based service that the user equipment has entered the polygon shaped geofence.

Optionally, in any of the preceding aspects, the method further includes partitioning, by the computing device, the polygon shaped geofence into one or more sub-regions, where each of the sub-regions is covered by a corresponding one of the multiple circular geofences.

Optionally, in any of the preceding aspects, the generating the multiple circular shaped geofences further includes measuring, by the computing device, a quality threshold of the multiple circular shaped geofences by calculating a difference between an area of the geographic region covered by the polygon shaped geofence and an area of the geographic region covered by the multiple circular shaped geofences.

Optionally, in any of the preceding aspects, the method further includes defining, by the computing device, a baseline threshold; generating, by the computing device, interpolation points that each lie inside of the polygon shaped geofence; calculating, by the computing device, a minimum number of the multiple circular geofences to generate based on the generated interpolation points; and evaluating, by the computing device, the calculated minimum number of the multiple circular geofences to determine whether the baseline threshold has been satisfied; in response to the quality threshold being greater than the baseline threshold, adjusting, by the computing device, the minimum number and generating the multiple circular geofences based on the adjusted minimum number, and in response to the quality threshold being less than or equal to the baseline threshold, generating, by the computing device, the minimum number of the multiple circular geofences to cover the polygon shaped geofence.

Optionally, in any of the preceding aspects generating the interpolation points includes filling, by the computing device, the geographic region with independent points; interpolating, by computing device, the independent points into the polygon shaped geofence defining the geographic region.

Optionally, in any of the preceding aspects, the method further includes partitioning, by the computing device, the interpolated independent points into sub-regions where each sub-region is covered by one of the multiple circular shaped geofences.

Optionally, in any of the preceding aspects, the calculating the minimum number of the multiple circular geofences includes calculating, by the computing device, initial center points of the multiple circular shaped geofences as the points that divide the polygon shaped geofence into the minimum number of equal parts in one direction; partitioning, by the computing device, the interpolated points into a minimum number of clusters and creating a single circular shaped geofence around the points in each of the clusters; and merging, by the computing device, the multiple circular shaped geofences, to reduce a total number of the multiple circular shaped geofences, in response to more than one of the multiple circular shaped geofences located inside of the polygon shaped geofence.

Optionally, in any of the preceding aspects, the determining that the current location of the user equipment is within the polygon shaped geofence further includes retrieving, by the computing device, position and accuracy information that defines a circular region surrounding a location of the user equipment; calculating, by the computing device, distances between the and each edge of the polygon shaped geofence; in response to the distances being greater than or equal to the accuracy, determining, by the computing device, whether the position is inside or outside of the polygon shaped geofence; and in response to at least one of the distances being less than the accuracy, determining, by the computing device, that an overlay exists between the circular region and the polygon shaped geofence.

Optionally, in any of the preceding aspects, in response to the distances being less than the accuracy: generating, by the computing device, M points interpolated in the circular region; identifying, by the computing device, N points that are inside of the circular region and the polygon shaped geofence; and calculating, by the computing device, a probability that the user equipment is located inside of the polygon shaped geofence as N/M, wherein N approximates a size of an overlay area between the circular region and the polygon shaped geofence, and M approximates a size of the area of the circular region.

Optionally, in any of the preceding aspects, the location based service is an application, a navigation system or a system providing information based on the current location of the user equipment.

According to one other aspect of the present disclosure, there is provided a device, including a non-transitory memory storage comprising instructions; and one or more processors in communication with the memory, wherein the one or more processors execute the instructions to generate multiple circular shaped geofences to cover a geographic region defined by a polygon shaped geofence; monitor the multiple circular shaped geofences to detect a current location of user equipment entering a boundary of any of the circular shaped geofences; determine, based on the detection, that the current location of the user equipment is within the polygon shaped geofence; and notify a location based service that the user equipment has entered the polygon shaped geofence.

According to still one other aspect of the present disclosure, there is provided A non-transitory computer-readable medium storing computer instructions geofencing, that when executed by one or more processors, cause the one or more processors to perform generating, by a computing device, multiple circular shaped geofences to cover a geographic region defined by a polygon shaped geofence; monitoring, by the computing device, the multiple circular shaped geofences to detect a current location of user equipment entering a boundary of any of the circular shaped geofences; determining, by the computing device and based on the detection, that the current location of the user equipment is within the polygon shaped geofence; and notifying a location based service that the user equipment has entered the polygon shaped geofence.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 4A-4B illustrate an example process of applying circular shaped geofences to a polygon shaped geofence.

FIG. 4C illustrates an example of a circular shaped geofence surrounding a polygon shaped geofence.

FIG. 6 illustrates an example of executing the process of FIG. 4A.

DETAILED DESCRIPTION

The present disclosure will now be described with reference to the figures, which in general relate to location based services and geofencing.

Geofencing is a technique used to monitor movement of a computing device, such as a mobile phone, within a geographic region, and notify or alert a user of the device when the geographic region has been entered or exited. A geofence defines the boundaries of the geographic region such that location data from the mobile phone may be compared to coordinates (e.g., latitude and longitude) of the geofence boundary or perimeter. The present disclosure addresses the accuracy of a mobile phone entering or exiting a geofence, and more specifically, provides a mechanism by which to determine when a mobile phone has entered or exited a polygon shaped geofence. In one embodiment, the techniques disclosed herein use multiple circular shaped geofences to approximate the polygon shaped geofence. Approximating the polygon shaped geofence in this manner allows for reduced processing and less power consumption.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
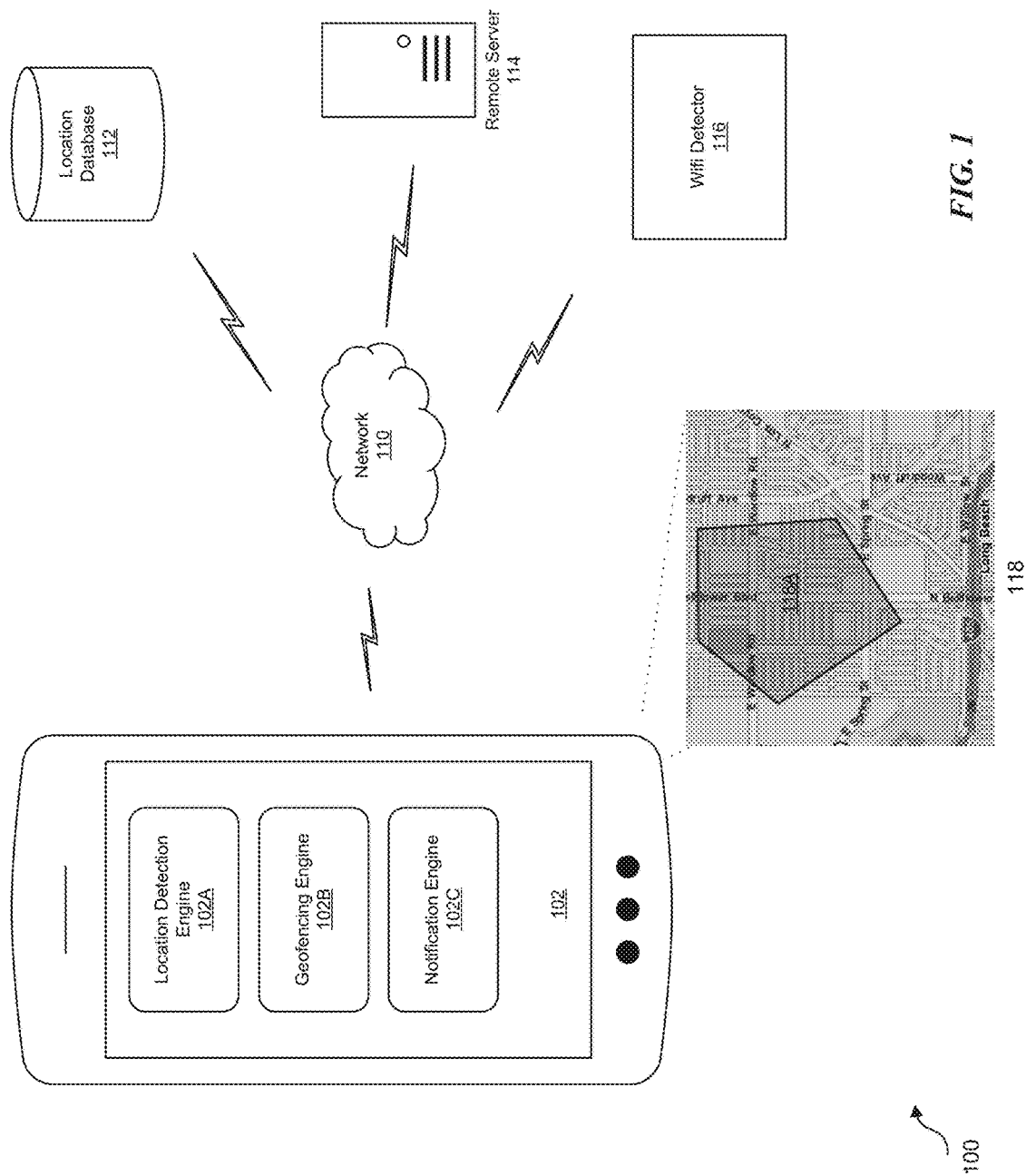
FIG. 1 illustrates an example system to generate a geofence.

FIG. 1 illustrates an example system to generate a geofence. The system includes a computing device 102, such as user equipment or a mobile device, and a remote server 114, that communicate over a network 110, such as the Internet.

The term "computing device" herein refers to any one or all of cellular telephones, smartphones, personal or mobile multi-media players, personal data assistants (PDA's), laptop computers, tablet computers, smartbooks, vehicle computing systems, terrestrial, marine and aviation navigation systems, ultrabooks, palm-top computers, wireless electronic mail receivers, multimedia Internet enabled cellular telephones, wireless gaming controllers, and similar personal electronic computing devices that include a memory, a programmable processor, and a Global Positioning System (GPS) receiver or other means of determining the current location. The term "computing device" also includes embedded computing devices with a processor and means for determining current location included within larger computing devices or vehicles, such as computing systems and/or navigation systems integrated within bicycles, automobiles, motorcycles, aircraft, boats, ships, etc.

In the disclosed non-limiting embodiment, the mobile device 102 includes a location detection engine 102A, a geofencing engine 102B, and a notification engine 102C. In one embodiment, the mobile device 102 can detect its location using the location detection engine 102A. The location detection engine 102A can detect the mobile device's current location using, for example, WiFi hotspots, cellular tower signals, and/or GPS signals. The location detection engine 102A may also access a remote server 114 (which may be located in the "cloud") to request location information, e.g., the remote server 114 can receive a list of WiFi hotspots from the mobile device and can provide a location based on the list, or the remote server 114 can request a location from a cellular service.

In one embodiment, the mobile device 102 (or user of the device) can generate a geographical boundary or perimeter using fencing to a generate geofence 118A (shown on map 118) using the geofencing engine 102B. In another embodiment, the mobile device 102 can receive geofences 118A from a server, e.g., remote server 114. As explained in more detail below, in one embodiment, the geofence 118A encloses a region that includes a location, which may be at or near the center of the region. In other embodiments, the geofence 118A encloses circular or elliptical regions that include a location. It is also appreciated that the mobile device 102 (or user of the device) may select predefined geofences stored on the mobile device 102 or a database, such as location database 112.

As noted above, the geofence 118A boundaries and services may be provided by a remote server, such as remote server 114. In this embodiment, any geofence-enabled application (e.g., application(s) 240 in FIG. 2) residing on the mobile device 102 receives the geographic location of nearby geofence(s) from the remote server 114. While executing on the computing device (e.g., mobile device 102), the geofence-enabled application continually determines its location—for example, through the computing device's GPS receiver and/or through a Wi-Fi (e.g., pre-mapped Wi-Fi access point locations) and/or cellular connections (e.g., pre-mapped cell tower locations)—and compares its location with the location of known geofences to determine whether a threshold or criteria (e.g., entering a geofence, leaving a geofence, crossing a geofence boundary or perimeter, etc.) has been satisfied. When the geofence-enabled application determines that a geofence threshold or criteria has been satisfied, the application may initiate a communication to a server storing geofence information to notify the server of the geofence event. Alternatively, the application may consume that geofence locally.

In another embodiment, the mobile device 102 can store WiFi identifiers (or other known networks) associated with a geofence 118A. The mobile device 102 sends a request to a WiFi detector 116. The request can include, for example, a location around which a geofence 118A should be generated, and may also include a distance or distances from which the center of the geofence 118A extends. For example, in the polygon shaped geofence 118A depicted in the figure, multiple radii or distances may extend from the center of the geofence 118A to each of the boundaries (or perimeters) defining the geofence 118A. The location itself may be established by the location detection engine 102A or received from a location database 112. In response, the WiFi detector 116 may provide WiFi identifiers within the radii defining the geofence 118A, or may respond with longitude and latitude coordinates of the WiFi identifiers. The response may then be stored in the mobile device 102 and associated with the geofence 118A.

The geofence engine 102A can detect whether the mobile device 102 is inside or outside of a generated geofence, such as polygon geofence 118A. In one embodiment, the inside of the geofence 118A is defined as including edges of the geofence, such as the boundaries or perimeters. In one other embodiment, the geofence engine 102B may also detect when the mobile device 102 is entering or leaving the geofence 118A. Entering or leaving a geofence may be detected as the mobile device 102 is actively crossing a boundary or perimeter of the geofence 118A, or when the mobile device 102 has completed crossing a boundary or perimeter of the geofence 118A. In one embodiment, the mobile device 102 can detect a current location of the mobile device as determined by GPS signals or cellular tower triangulation. For example, the geofence engine 102B can use GPS signals or cellular tower triangulation to obtain longitude and latitude coordinates of the mobile device's 102 current location. The geofence engine 102B can compare the longitude and latitude coordinates from the GPS signals or cellular tower triangulation to those of the geofence 118A to determine whether the mobile device is within the geofence 118A.

Upon detection that the mobile device is inside a geofence 118A, the geofence engine 102B sends an indication to the notification engine 102C. The notification engine 102C can provide a notification to an operating system or application running on the mobile device 102. For example, the notification can cause an application to execute an action, e.g., send the notification to a location based server. In another example, the notification is sent to an application associated with a merchant to indicate to a user that the user is proximate to the geographic location of the merchant.

The mobile device 102 can also communicate with a location database 112 over the network 110. The location database 112 may provide locations associated with points of interest. For example, a user of the mobile device 102 may be interested in the location of a restaurant. In this case, when the location database 112 receives a request from the mobile device 102, including a location of the mobile device 102, the location database 112 can respond with one or more restaurant locations near the mobile device 102. In one embodiment, the locations may be represented as longitudes and latitudes. Once a response is received from the location database 112, the mobile device 102 can provide the restaurant locations to the geofencing engine 102B. The geofencing engine 102B can then process the restaurant locations and generate a geofence 118A around the locations.

Figure 2:
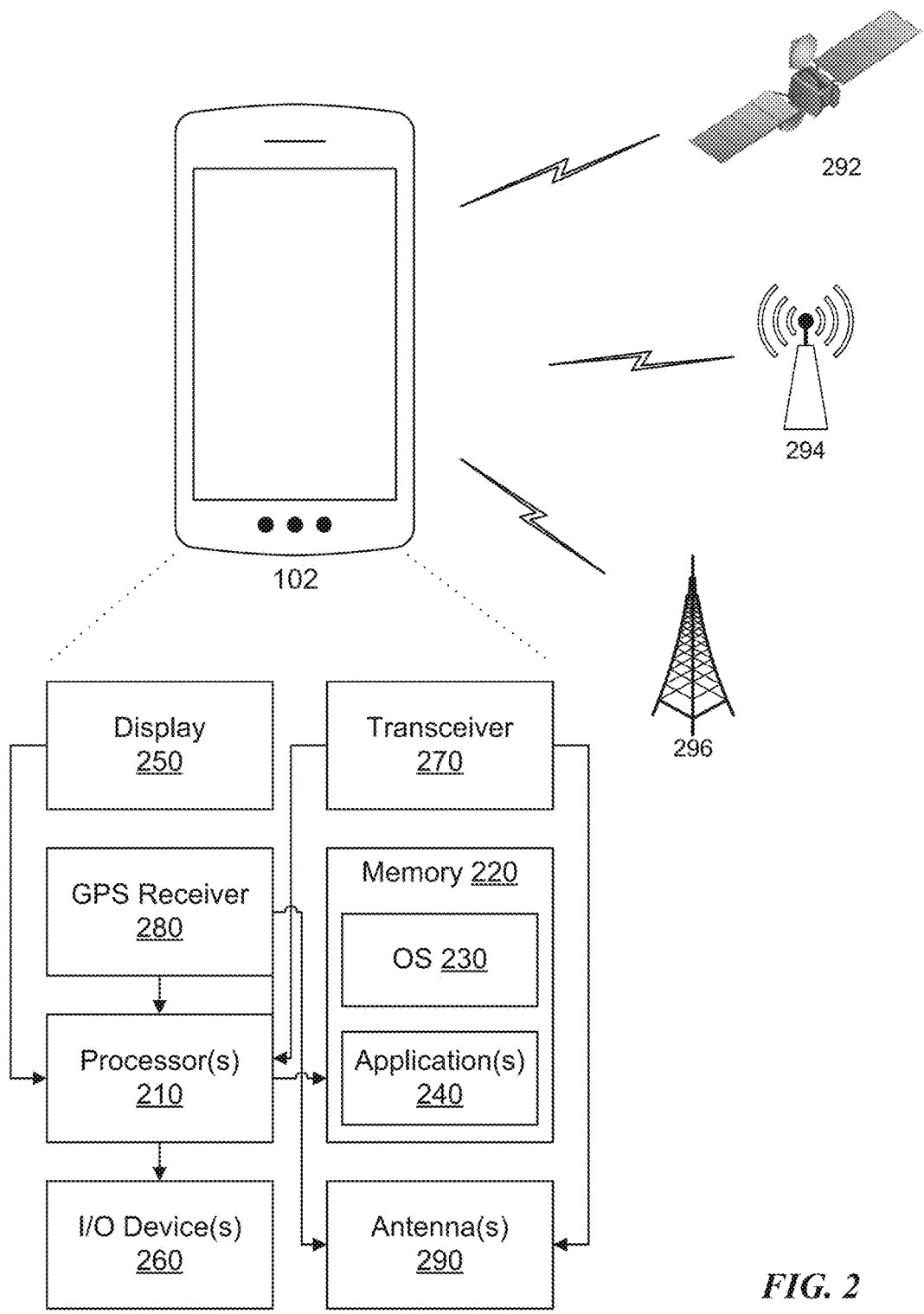
FIG. 2 illustrates an example computing device that may be used in the system of FIG. 1.

FIG. 2 illustrates an example computing device that may be used in the system of FIG. 1. The computing device, in this example mobile device 102, may include a processor(s) 210, and a memory 220, such as a Random Access Memory (RAM), a flash memory, or other type of memory, which is accessible to the processor(s) 210. The memory 220 may be adapted to store an operating system (OS) 230 and applications 240, such as a geofence-enabled application that may provide location-based services to a user of the mobile device 102.

The geofence-enabled application(s) 240 may operate on top of the OS 230 and may be executed by the processor(s) 210. The geofence-enabled application(s) 240 may determine the computing device's current location using various techniques. For example, the geofence-enabled application(s) 240 may receive the computing device's current location from an optional GPS receiver 280. In another example, the geofence-enabled application(s) 240 may determine the computing device's current location using various local positioning systems, such as by utilizing a radio-frequency transceiver 270 and one or more antennas 290 to receive signals from multiple Wi-Fi access points, Bluetooth beacons, cell towers, base stations, etc. In another embodiment, the geofence-enabled applications may utilize both GPS and various local positioning systems.

The processor(s) 210 may be coupled to a display 250 and to one or more input/output (I/O) devices 260, such as a keypad, a touch panel sensor, a microphone, etc. The processor(s) 210 may also be coupled to a transceiver 270 that interfaces with an antenna(s) 290. The transceiver 270 may be configured to both transmit and receive cellular network signals, wireless data signals, or other types of signals via the antenna 290.

In one embodiment, a GPS receiver 280 may also make use of the antenna 290 to receive GPS signals, which may be communicated via communication satellite 292 (e.g., GPS satellite). In another embodiment, the antenna(s) 290 receives communications from and transmits communications to a nearby base station(s) 296.

The transceiver 270, via antenna 290, may wirelessly communicate with the base station(s) 296, for example, over a cellular wireless network using cellular communication protocols and standards for both voice calls and packet data transfer such as GSM, CDMA, GPRS, EDGE, UMTS, LTE, 5G, etc. In one other embodiment, the antenna 290 receives communications from and transmits communications to a wireless router(s) 294 (or access point).

Figure 3:
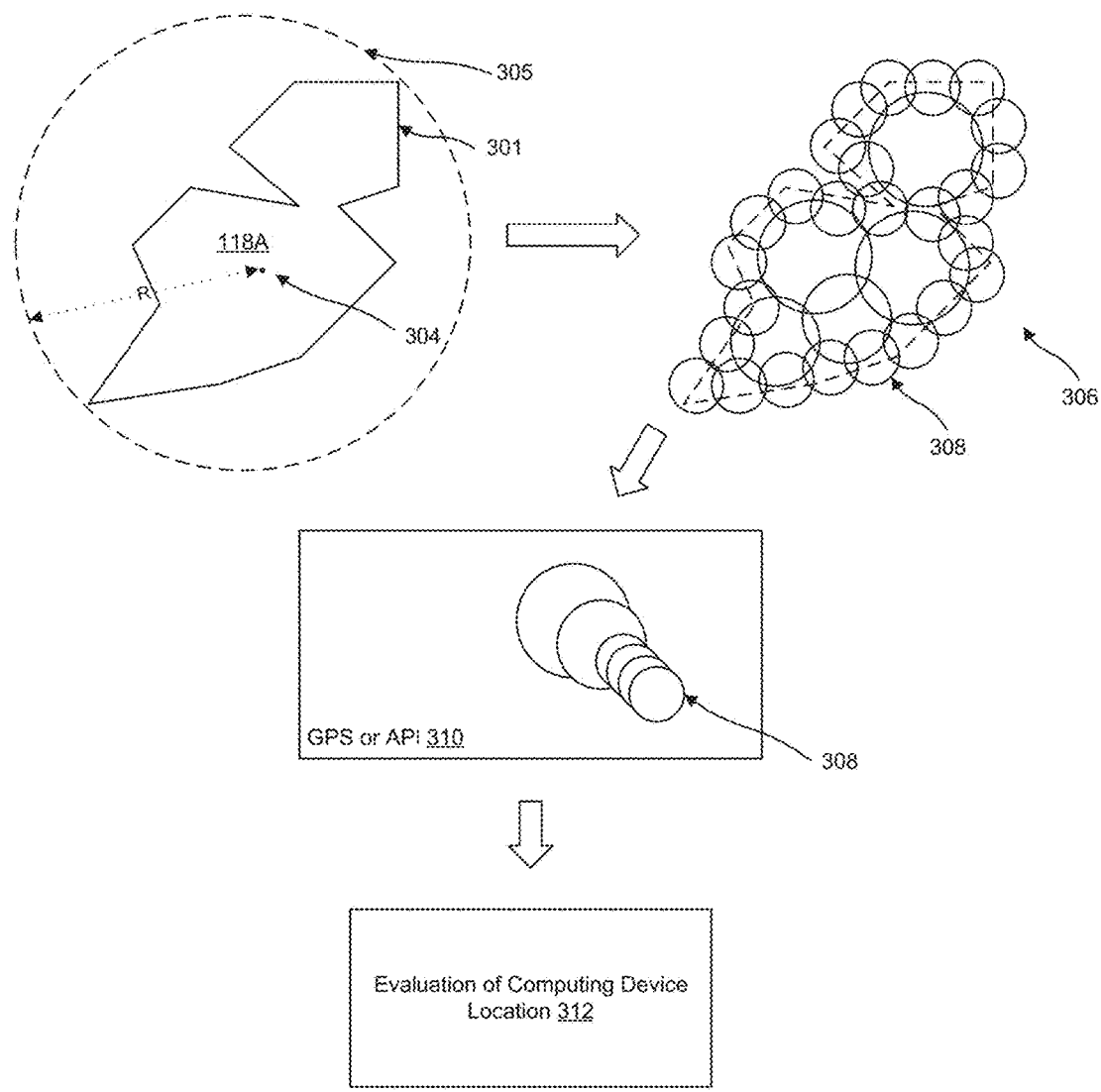
FIG. 3 illustrates an example process of evaluating a location of a computing device.

FIG. 3 illustrates an example process of evaluating a location of a computing device. Various techniques exist to generate and monitor a geofence, such as polygon shaped geofence 118A. In one example, a location enabled mobile device 102 may be used to define a spatial boundary to identify or surround a point of interest 304 (such as a business, an institution, landmark, park, or other location that would be of interest to a user) that detects when the GPS enabled mobile device 102 enters and/or exits a boundary (e.g., boundary 301) of the geofence 118A. Users may define these boundaries, for example, using a graphical user interface (UI) tool for creating a polygon shaped "box" and/or boundaries (or perimeters) that initiate or trigger an event when such boundaries are entered or crossed. Another technique uses selection of a point of interest 304, such as a latitude and longitude, and defining either a radius or major/minor axis for the point of interest 304 in order to create a boundary around the point of interest 304.

While the mobile device 102 may define the boundaries or perimeters of a geofence such that the geofence is shaped as a polygon, GPS receivers (or enabled software services or application programming interface (API)) support circular and rectangular shaped geofences, not polygon shaped geofences. Thus, when applying conventional geofencing techniques, an area or region that is defined by boundaries or perimeters to form a polygon shaped geofence is analyzed using a single circular or rectangular shaped geofence, such as circular shaped geofence 305.

Analyzing a polygon shaped geofence using a single circular or rectangular shaped geofence reduces the accuracy of the location-based information, as the area or region originally covered by the polygon shaped geofence is now covered by a single circular shaped (or other single shape) geofence that modifies the original area or region (i.e., covers a larger area or region). For example, the circular shaped geofence 305 is defined by the point of interest 304, typically representing the center of a desired geographic location, and a radius R which establishes the radius of a circle a distance from the point of interest 304. The radius R may be pre-determined to define a desired geographic area to cover the polygon shaped geofence 118A. Once the circular shaped geofence 305 is established, the mobile device 102 may be monitored to determine the presence and location of the mobile device 102 within the circular shaped geofence 305, which approximates the polygon shaped geofence 118A.

To provide better location based accuracy, and reduce the amount of area or region outside of the polygon shaped geofence 118A, the computing device (e.g., mobile device 102) generates multiple circular shaped geofence regions 308 to cover the polygon shaped geofence 118A. As shown in the figure with reference to 306, the polygon shaped geofence 118A is "packed" with the multiple circular shaped geofence regions 308. In one embodiment, the multiple circular shaped geofence regions 308 are placed to minimize the amount of space (area) outside of the polygon shaped geofence 118A. In one embodiment, individual or sets (groups) of circular shaped geofences 308 may have varying sizes. For example, as illustrated, the outermost circular shaped geofences 308 are smaller than the innermost circular shaped geofences 308. It is appreciated, however, that the circular shaped geofences 308 may be in any of a variety of sizes and placed to cover the polygon shaped geofence 118A in any number of different configurations.

In one embodiment, packing the multiple circular shaped geofences 308 is accomplished using a k-means clustering algorithm to partition the polygon shaped geofence 118A into sub-regions and then create multiple circular shaped geofences 308 to cover each of the sub-regions, as explained below with reference to FIGS. 4A, 4B and 4C. After the creation of the multiple circular shaped geofences 308, they may be loaded into the geofencing engine 102B at 310, which may process each of the circular shaped geofences 308. In one embodiment, the circular shaped geofences 308 are input into the GPS receiver 280 or enabled software services or APIs at 310.

The geofencing engine 102B monitors the circular shaped geofences 308 and sends out a notification when a current location of the mobile device 102 is inside any of the circular shaped geofences 308. For example, the location of the mobile device 102 (which may be determined by location detection engine 102A or GPS receiver 280) may be compared to the boundary or perimeter of each circular shaped geofences 308 to determine whether the mobile device 102 is within any one of the circular shaped geofences 308. In one embodiment, the mobile device 102 may include one or more application(s) 240 (geofence-enabled applications) to manage the circular shaped geofences 308 associated with one of the defined sub-regions of the polygon shaped geofence 118A. The application(s) 240 may use the mobile device's 102 location based services (positioning capabilities) to determine whether the mobile device 102 has crossed the boundary or perimeter of one of the circular shaped geofences 308. When the mobile device 102 has been determined to have entered or crossed a boundary or perimeter of one of the circular shaped geofences 308, a notification or indication may be sent to report that the mobile device 102 has entered or crossed into a particular one of the circular shaped geofences 308.

Once the notification has been received, the geofencing engine 102B determines at 312 whether the current location of the mobile device 102 is inside, outside or overlaying (crossing the boundary or perimeter) the polygon shaped geofence 118A. The current location of the mobile device 102, as will be explained below with reference to FIGS. 5B, 5C and 5D, is represented by a circular region surrounding a location (center point) of the mobile device 102 in relation to the polygon shaped geofence 118A.

Figure 4A:
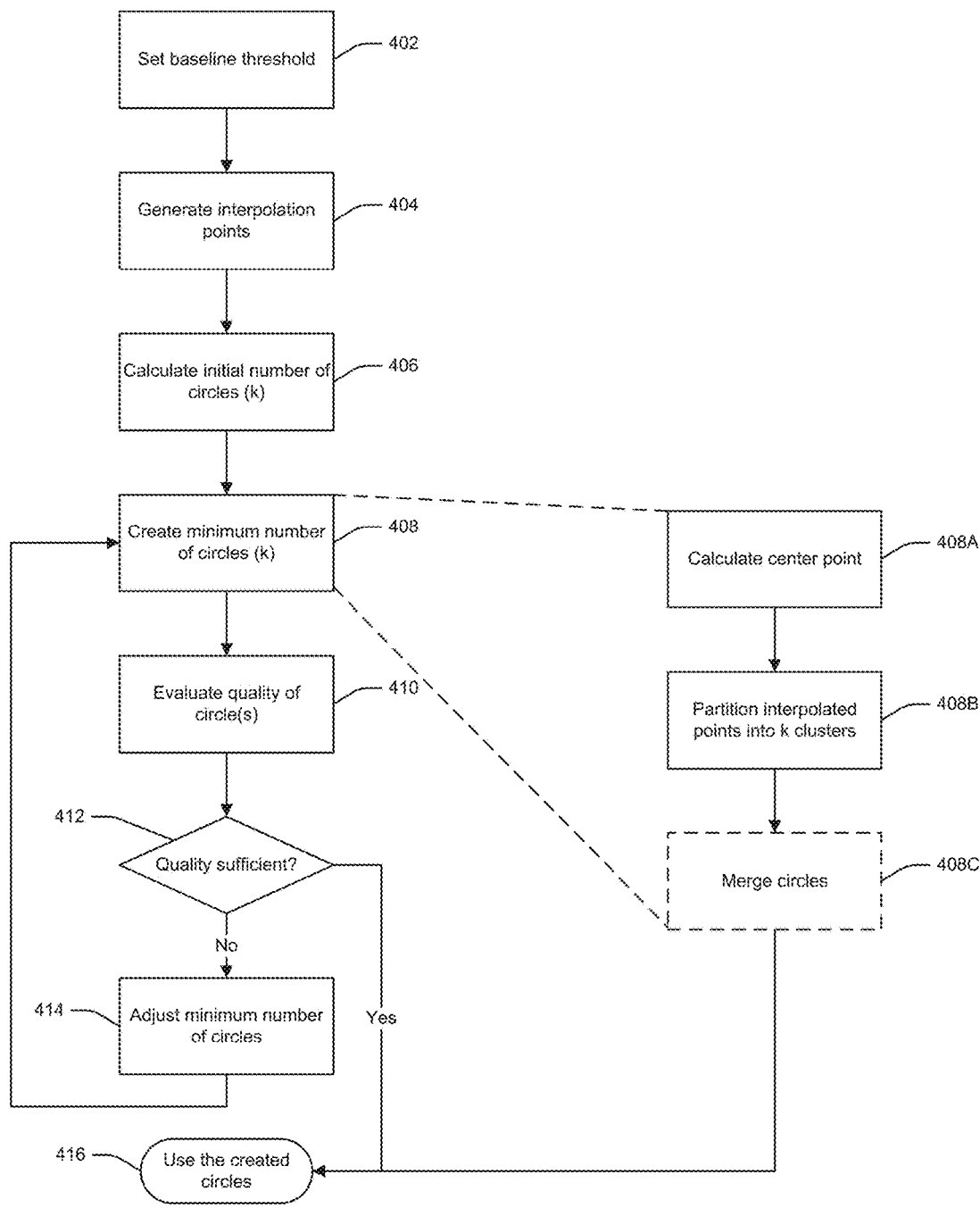

FIG. 4A illustrates an example process of applying circular shaped geofences to a polygon shaped geofence. In one embodiment, the process is performed by the mobile device 102. In another embodiment, the process is performed on a server, such as remote server 114, remotely located from the mobile device 102. However, it is appreciated that any of the devices or components in FIGS. 1, 2 and 8 may perform the process. In the example that follows, and for purposes of discussion, the process is performed by the processor(s) 210 on the mobile device 102.

To support the use of geofences, mobile device 102 will repeatedly determine its current location. The current location may then be compared to a location defining the boundary or perimeter that defines a particular geofence (e.g., a geofence surrounding a point of interest). However, constantly polling the current location by the mobile device 102 for comparison consumes resources, including processing resources and power consumption. The more complex the shape of the geofence (e.g., polygon geofence), the more processing resources and power consumption. Likewise, the less complex the shape (e.g., circular geofence), the less processing resources and power consumption are required by the mobile device 102. Thus, while the mobile device 102 may theoretically support geofences of any shape or size, they are limited by the amount of processing resources and power consumption of the actual device.

To reduce the overall processing and power consumption of the processor(s) 210 in the mobile device 102, the disclosed technology uses multiple circular shaped geofences 308 to approximate more complex geofence shapes, such as polygon shaped geofence 118A. For example, the multiple circular shaped geofences 308 may be generated and distributed to cover the polygon shaped geofence 118A (shown as 306 in FIG. 3). The distribution of the circular shaped geofences 308 may be even, random or arbitrary. Distribution of the multiple circular shaped geofences 308 in this manner effectively "transforms" or "translates" the more complex shaped polygon geofence 118A into less complex circular geofences 308. The less complex circular shaped geofences 308 may be processed by GPS receiver 280, which is otherwise not capable of processing polygon shapes, and consumes far less processing resources and power compared to processor(s) 210.

Once the translation from a polygon shaped geofence 118A to multiple circular shaped geofences 308 has been processed, the GPS receiver 280 may continually monitor the current location of the mobile device 102 and determine when the current location has crossed or entered into any of the multiple circular shaped geofences 308.

At 402, a baseline threshold (B1) is set. The baseline threshold (B1) defines the maximum distance or area that the current location of mobile device 102 may be located outside of the polygon shaped geofence 118A, despite the current location of the mobile device 102 actually being located inside of the polygon shaped geofence 118A. This may occur, for example, when one of the multiple circular shaped geofences 308 approximating the polygon shaped geofence 118A has a region that extends beyond the boundary or perimeter of the polygon shaped geofence 118A, and the mobile device 102 enters this "extended" region. For example, and with reference to FIG. 4B, region R1 is a portion of circular shaped geofence 308 that is located outside (i.e., extends beyond the boundary or perimeter) of the polygon shaped geofence 118A. Following this example, as the circular shaped geofence with region R1 approximates the polygon shaped geofence 118A, and the mobile device 102 is determined to be in the circular shaped geofence 308 with region R1, the mobile device 102 is determined to be outside of polygon shaped geofence 118A, despite being located inside of the polygon shaped geofence 118A. In one embodiment, and in order to minimize this occurrence, the baseline threshold (B1) may be adjusted to account for various factors, such as accuracy of pinpointing location or the amount of processing power available, as explained below.

At 404, the processor(s) 210 generates interpolation points (represented by dots) that should be inside (or on the edge—i.e., boundary or perimeter) of the polygon shaped geofence 118A.

At 406, an initial number of circles (k) (where each circle represents the circular shaped geofence 308) is calculated. In one embodiment, the initial number of circles (k) is the minimum number of circles that will cover the polygon shaped geofence 118A.

Determining (calculating) the initial number of circles (k) may depend on the level at which the baseline threshold (B1) is set, i.e. the level at which the quality of the outcome is satisfied. For example, if the baseline threshold (B1) is set high, the initial number of circles (k) may be low compared to the baseline threshold (B1) being set low, in which case the initial number of circles (k) may be higher. Thus, the initial number of circles (k) directly relates to the baseline threshold (B1).

For example, and with reference to FIG. 4C showing an instance of a circular shaped geofence surrounding a polygon shaped geofence, the initial number of circles (k) may be initialized by generating a single circle 450 to cover the polygon 452 (when a single circular shaped geofence is sufficient to satisfy the baseline threshold (B1)). For ease of discussion, a single circle 450 is illustrated, along with a polygon 452 of simple shape (minimal boundaries). It is appreciated, however, that multiple circles and more complex polygon shapes may be used, similar to those presented in the earlier figures.

In one embodiment, the single circle 450 is the circle with the smallest diameter D that can cover the entire polygon 452, as shown. Once established, the geographic midpoint (MidPoint) of the polygon vertices is determined, and the distances between each MidPoint and each vertex is calculated. The maximum (maxD) and minimum (minD) distances are then used to calculate the initial number of circles (k) as maxD/minD. (The calculated initial number of circles (k) is rounded to the nearest whole number, as necessary).

With continued reference to FIG. 4C, the quality threshold (Q1) of the circle(s) 450 is determined. The quality threshold (Q1) may be measured as the difference between the area covered by polygon 452 and that covered by circle(s) 450. The quality threshold (Q1) is determined as the difference (M)/diameter (D), where the difference (M) is the maximum distance between the circles' 450 external edge and the nearest polygon 452 edge, and the diameter (D) is the diameter of the smallest circle 450 that can cover the entire polygon 452. The quality threshold (Q1) may be compared against the baseline threshold (B1) to determine whether quality is sufficient, as explained below.

A larger number of circles being generated (and therefore smaller in size) enables the polygon shaped geofence to be approximated more accurately (FIGS. 7A and 7B below illustrate varying circle sizes). However, a larger number of circles (k) also requires additional processing resources, increased power consumption and an increased load to GPS receiver 280. Thus, the number of circles should be minimized to reduce the impact on processing resources, power consumption and load to the GPS receiver, while maintaining a quality threshold (Q1) that satisfies the baseline threshold (B1).

A lower Q1 results in a higher accuracy (of determining location), but requires more circles and resources. A higher Q1 results in a lower accuracy, but requires less circles and resources. Table I below shows an example of this distinction.

TABLE I

| Q1 | Accuracy | Circle Number | Resources |
|---|---|---|---|
| Lower | Higher | More | More |
| Higher | Lower | Less | Less |

In one embodiment, an area or region may exist that is covered by the polygon 452, but not by the circle(s) 450 (not shown). As the circle(s) 450 are being evaluated to approximate the polygon, this may result in the area or region forming a gap (i.e., an area which is outside of any circle(s) 450 but within the polygon 452). To determine whether the gap exists, a secondary threshold (M2) may be measured as C/P, where C is the area covered by the polygon 452 but not the circle(s) 450, and P is the area covered by the polygon 452.

At 408, the minimum number of circles (k) to cover the polygon are created. As illustrated in FIG. 4B, utilizing the generated interpolation points, the polygon shaped geofence 118A may partitioned into sub-regions 118B using a clustering algorithm, such as the k-means clustering algorithm. It is appreciated that the clustering is not limited to a k-means clustering algorithm and that any clustering algorithm may be employed. Once partitioned into sub-regions 118B, the multiple circular shaped geofences 308 (circles) may be generated and placed to cover each of the sub-regions 118B. The process is described in more detail with reference to sub-processes 408A, 408B and 408C.

At 408A, 'k' center points are initialized as the points at which to divide the polygon 118A into partitions. In one embodiment, the partitions are equal parts in one direction. In one embodiment, the division is formed along a latitude (lat_span) or longitude (lon_span)—whichever is larger. This allows the cluster algorithm to rapidly converge. The latitude (lat_span) may be calculated as the maximum latitude–minimum latitude, and the longitude (lon_span) may be calculated as the maximum longitude–minimum longitude.

For example, and assuming that lon_span is larger than lat_span, an array of longitude with k elements (tempArray [k]) is created. Each element tempArray[i] is initialized as follows: tempArray[i]=minimum longitude+(i+1)*(Lon_Span/k+1)). An array of center points (PreCenterPoint[k]) may then be generated. Each element PreCenterPoint [i] is initialized as follows: PreCenterPoint[i]=a point within interpolated points set, which longitude is equal to (or closest to) tempAarray[i]. More than one point may be available. In this case, any of the points may be selected as the center point. It is appreciated that the calculations may also be applied to determine the center point for the latitude array.

At 408B, the interpolated points are partitioned into k clusters (for example, using the k-means clustering algorithm), and circle(s) 308 are created to surround the points in each of the clusters (FIG. 4B). More specifically, an array ClusterArray with k elements is allocated, where each element has the following sub-elements: (1) CenterPoint: the center point of the cluster; and (2) PointArray[ ]: an array of points, including all of the points belonging to the cluster. The ClusterArray is then initialized as: ClusterArray[i]. CenterPoint=PreCenterPoint[i], and each point in the interpolated point set is looped to find the cluster in ClusterArray whose CenterPoint is closest to this point, and the point is used in the corresponding PointArray[ ]. Subsequently, each cluster in ClusterArray[ ] is looped and the CenterPoint using PointArray[ ] is re-calculated. For example, if there are n points in PointArray[ ]:

$$CenterPoint.latitude = \left(\sum_{i=0}^{n} PointArray[i].latitude\right) / n$$

$$CenterPoint.longitude = \left(\sum_{i=0}^{n} PointArray[i].longitude\right) / n$$

After re-calculating the CenterPoint, each cluster is looped to calculate the distance between the ClusterArray[i]. CenterPoint and PreCenterPoint [i]. If each of the calculated distances are small enough, then a circle is created to surround the points in the PointArray[ ]. Otherwise, each cluster is looped such that: PreCenterPoint [i]=ClusterArray [i]. CenterPoint, followed by creating a circle to surround the points in the PointArray[ ].

At 408C, and when more than one circle 308 exists that is entirely within the polygon 118A, optionally merge the circles 308 to reduce the total number of circles (k). For each circle 308 that is entirely within the polygon, place the circle 308 into the array SubClusterArray[ ]. A virtual polygon may then be created from the CenterPoints of SubClusterArray[ ], and the initial circle number (k) is calculated and new circle(s) 306 generated (re-generated).

At 410, the quality threshold (Q1) of the generated circle(s) 308 are evaluated to determine whether the quality satisfies the baseline threshold (B1). When the quality threshold (Q1) is less than or equal to the baseline threshold (B1) (i.e., Q1<=B1), the generated circles satisfy the accuracy requirements (i.e., the baseline threshold (B1) is satisfied and the desired accuracy of the location of a computing device is achieved). Accordingly, the quality is sufficient as determined at 412 and the generated circles (308) may be used to approximate the polygon shaped geofence 118A at 416.

When the quality threshold (Q1) is greater than the baseline threshold (B1) (i.e., Q1>B1), the generated circles fail to satisfy the accuracy requirements (i.e., the baseline threshold (B1) is not satisfied and the desired accuracy of the location of a computing device is not achieved). Accordingly, the quality is insufficient as determined at 412 and the generated circles (308) may be discarded, the minimum number of circles 308 is adjusted by returning to 408, where the minimum number of circles (k) is recalculated.

Figure 5A:
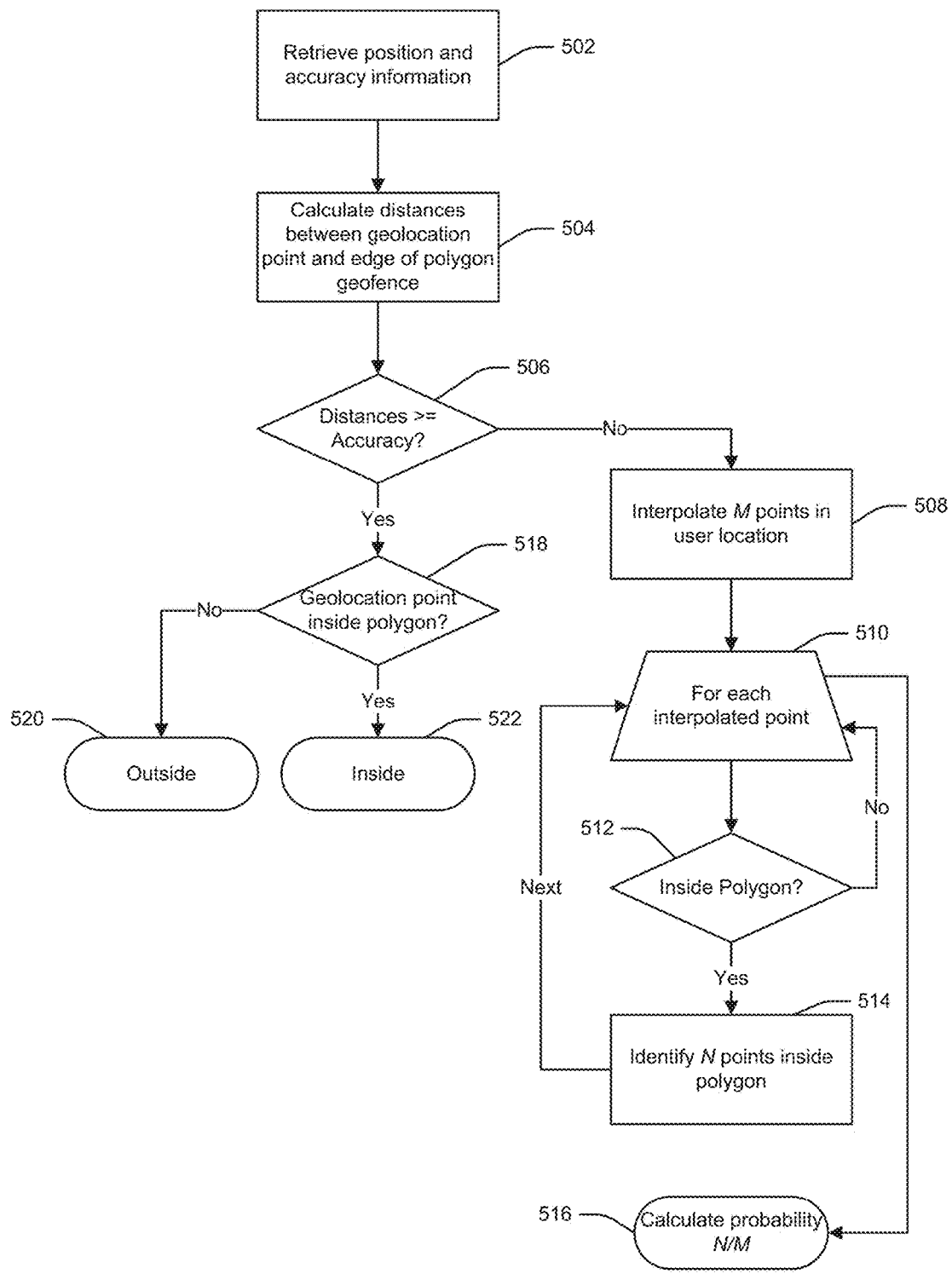
FIGS. 5A-5E illustrate an example process of determining the location of a computing device in relation to a geofence.
Figure 5B:
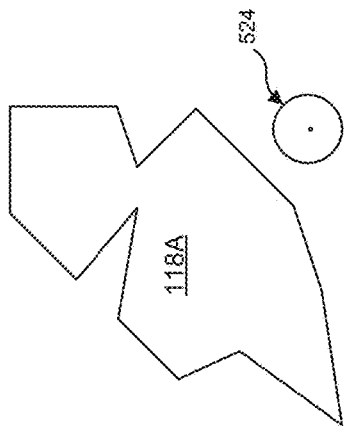
Figure 5C:
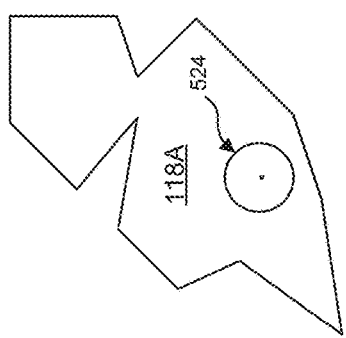
Figure 5D:
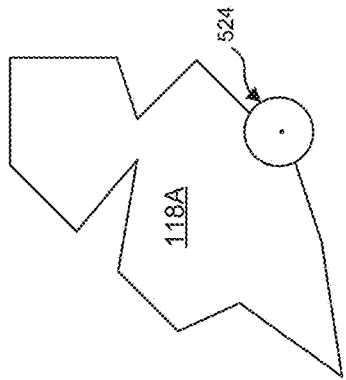

FIG. 5A illustrates an example process of determining the location of a computing device in relation to a geofence. In one embodiment, the process is performed by the mobile device 102. In another embodiment, the process is performed on a server, such as remote server 114, remotely located from the mobile device 102. However, it is appreciated that any of the devices or components in FIGS. 1, 2 and 8 may perform the process. In the example that follows, and for purposes of discussion, the process is performed by the processor(s) 210 on the mobile device 102.

The mobile device 102, as previously noted, has the ability to detect and report its location (e.g., latitude and longitude) and accuracy (e.g., a distance from the location) using a cell tower or Wi-Fi triangulation (e.g., using base station 296 or access point 294), and also has the ability to detect and report its location and accuracy using GPS (e.g., GPS receiver 280). The mobile device 102 may also run an application(s) (e.g., application(s) 240) in the background that can be triggered by the operating system (e.g., OS 230) of the device upon certain predefined events or conditions, and further has the ability to notify the background process when certain predefined location events have occurred. In one embodiment, the mobile device 102 communicates with remote server 114 via network 110 to receive geofence entry and exit events from the mobile device 102.

When the GPS receiver 280 or the geofence engine 102B reports that the location of the mobile device 102 is within one or more of the multiple circular shaped geofences 308, the mobile device 102 may then evaluate its location in relation to the polygon shaped geofence 118A (312 in FIG. 3). The evaluation may determine whether the mobile device 102 is inside, outside or crossing the boundary or perimeter of (overlaying) the polygon shaped geofence 118A.

Accuracy of a location is typically a distance within a latitude and longitude (location) reported by the mobile device 102. Thus, the accuracy is deemed the radius of a circle 524 (circular region) from a center point defined as the current latitude and longitude of the mobile device 102. Assuming a high probability that the location is inside of the circle 524, where the probability is "LocP" and the circle 524 is "LocCircle", the probability that the location of the mobile device 102 is inside of the polygon shaped geofence 118A is defined as: S1/S2, where S1 is the size of an overlay region between LocCircle and the polygon shaped geofence 118A, and S2 is the size of LocCircle where S2=πAccuracy². However, the determination of S1 is more complex and requires an approximation.

Figure 5E:
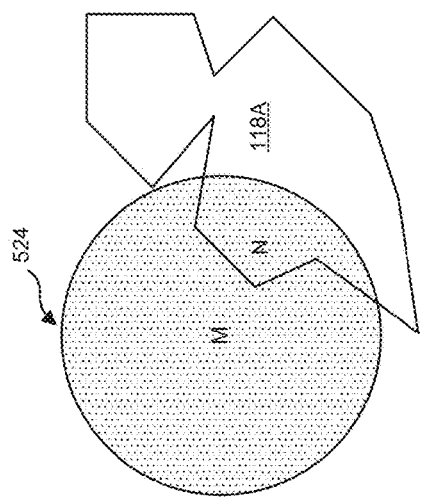

To approximate S1/S2, M points are interpolated in LocCircle. In one embodiment, the points are evenly interpolated. The number of the points (N) which are inside both polygon shaped geofence 118A and LocCircle are then determined, and S1/S2 is approximated by N/M (FIG. 5E).

Turning back to FIG. 5A, the process of determining the location of a computing device in relation to a geofence is discussed in further detail. At 502, the location and accuracy of the mobile device 102 are retrieved. The location and accuracy may then be used to construct the circle 524 of the mobile device 102. For example, the latitude and longitude (location) may be used as a center point of the circle 524 and the accuracy (a distance from the location) may be a radius of the circle 524.

At 504, each distance between the location (latitude, longitude) and each edge of the polygon shaped geofence 118A is calculated. Each of the calculated distances is compared against the accuracy at 506 to determine whether the distance is greater than or equal to the accuracy (distance≥accuracy).

At 518, the location of the mobile device 102 is determined to be outside of the polygon shaped geofence 118A if the center point of the circle 524 is outside of the polygon shaped geofence 118A (FIB. 5B). In this scenario, a notification is returned at 520 indicating that the mobile device 102 is outside of the polygon shaped geofence 118A. Otherwise, at 518, the location of the mobile device 102 is determined to be inside of the polygon shaped geofence 118A if the center point of the circle 524 is inside of the polygon shaped geofence 118A (FIG. 5C). In this scenario, a notification is returned at 522 indicating that the mobile device 102 is inside of the polygon shaped geofence 118A.

In one embodiment, if each of the calculated distances is not greater than or equal to the accuracy as determined at 506, then an overlay (i.e., mobile device 102 is crossing boundary or perimeter) exists between the circle 524 and the polygon shaped geofence 118A, and the process proceeds to 508 to determine the probability that the mobile device 102 is inside of the polygon shaped geofence 118A.

At 508, and with reference to FIG. 5E, M points are interpolated in the circle 524. At 510, each of the interpolated points are checked to determine whether it is inside polygon shaped geofence 118A. For each interpolated point outside of the polygon shaped geofence 118A, as determined at 512, the process returns to 510. If an interpolated point is determined at 512 to be inside of the polygon shaped geofence 118A, the process continues to 514 and identifies each point (N) inside of the polygon shaped geofence 118A, and then returns to 510.

Upon completion of determining whether each interpolated point is inside of the polygon shaped geofence 118A, the probability of S1/S2 is approximated as N/M, where N is the number of interpolated points inside of the polygon shaped geofence 118A.

FIG. 6 illustrates an example of executing the process of FIG. 4A. As previously noted, the process of FIG. 4A, which details the packing of circular shaped geofences within polygon shaped geofences, may be executed on different platforms. In the embodiment of FIG. 4A, the process is described as being executed on the mobile device 102. In another embodiment, as depicted in the figure, the process may be executed on a remote server 114 that is in communication with network 110 (i.e., a server in the cloud). To avoid processing on the mobile device 102, which has less processing resources, the circular shaped geofences 308 may be generated on the remote server 114. For example, circular shaped geofences 308 that satisfy a lower quality threshold (Q1) (obtaining higher accuracy) require additional computing resources. Rather than consume significant resources on the mobile device 102, the processing may be performed on the remote server 114. Upon completion of the process, the remote server 114 may distribute the calculations to the mobile device 102.

Figure 7B:
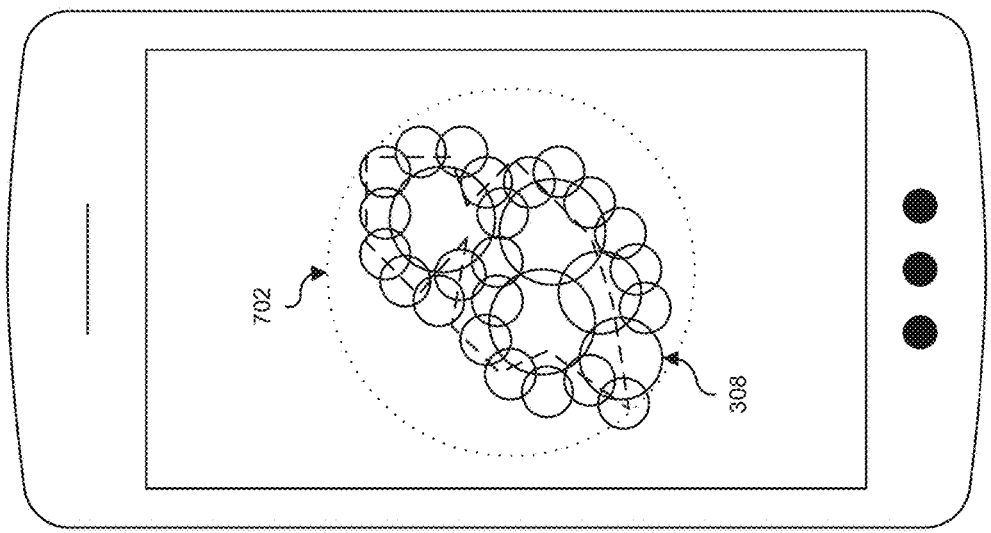
FIGS. 7A and 7B illustrate performance data when generating circular shaped geofences using different baseline thresholds.
Figure 7A:
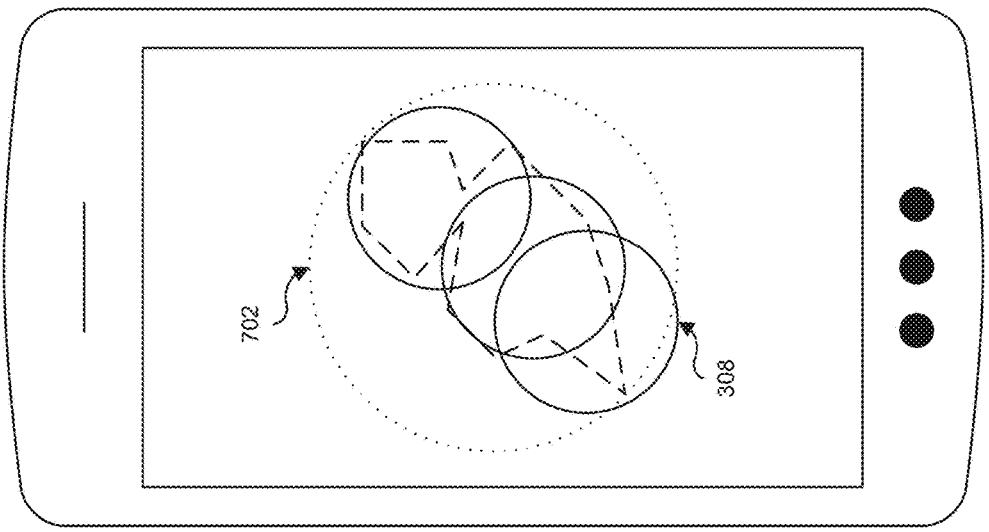

FIGS. 7A and 7B illustrate performance data when generating circular shaped geofences using different baseline thresholds. As depicted in the diagrams, the circular shaped geofences 308 (solid line) are generated in accordance with the above processes, and the circular shaped geofence 702 (dotted lines) covering the entire polygon are generated in accordance with conventional techniques. Table II (corresponding to FIG. 7A) below provides Q1, M2 results where Q1 has been set to 0.20, and Table III (corresponding to FIG. 7B) provides Q1, M2 results where Q1 has been set to 0.10. The CPU execution time indicates the execution time (single thread).

TABLE II

| Quality & Performance | |
|---|---|
| the diameter of the smallest circle | 1952.79 m |
| max distance between circles' external edges with their closest polygon edges | 379.13 m |
| Q1 | 0.19 |
| M2 | 0.0 |
| CPU Execution Time | 0.351 s |

TABLE III

| Quality & Performance | |
| --- | --- |
| the diameter of the smallest circle | 1952.79 m |
| max distance between circles' external edges with their closest polygon edges | 159.92 m |
| Q1 | 0.081 |
| M2 | 0.0 |
| CPU Execution Time | 54.26 s |

Based on the implementation of the process in FIG. 5A described above, CPU execution time is <1 ms, and total memory usage is <6.1 KB. Table IV illustrates the details the performance.

TABLE IV

Environment
Test: Polygon with 40 Vertices, "CPU Execution Time"

| CPU Execution Time | Code Size (Bytes) | Data/BSS Size (Bytes) | Heap Size (Bytes) | Stack Size (Bytes) |
| --- | --- | --- | --- | --- |
| <1 ms | 3984 | 48 | 1728 | 464 |

Figure 8:
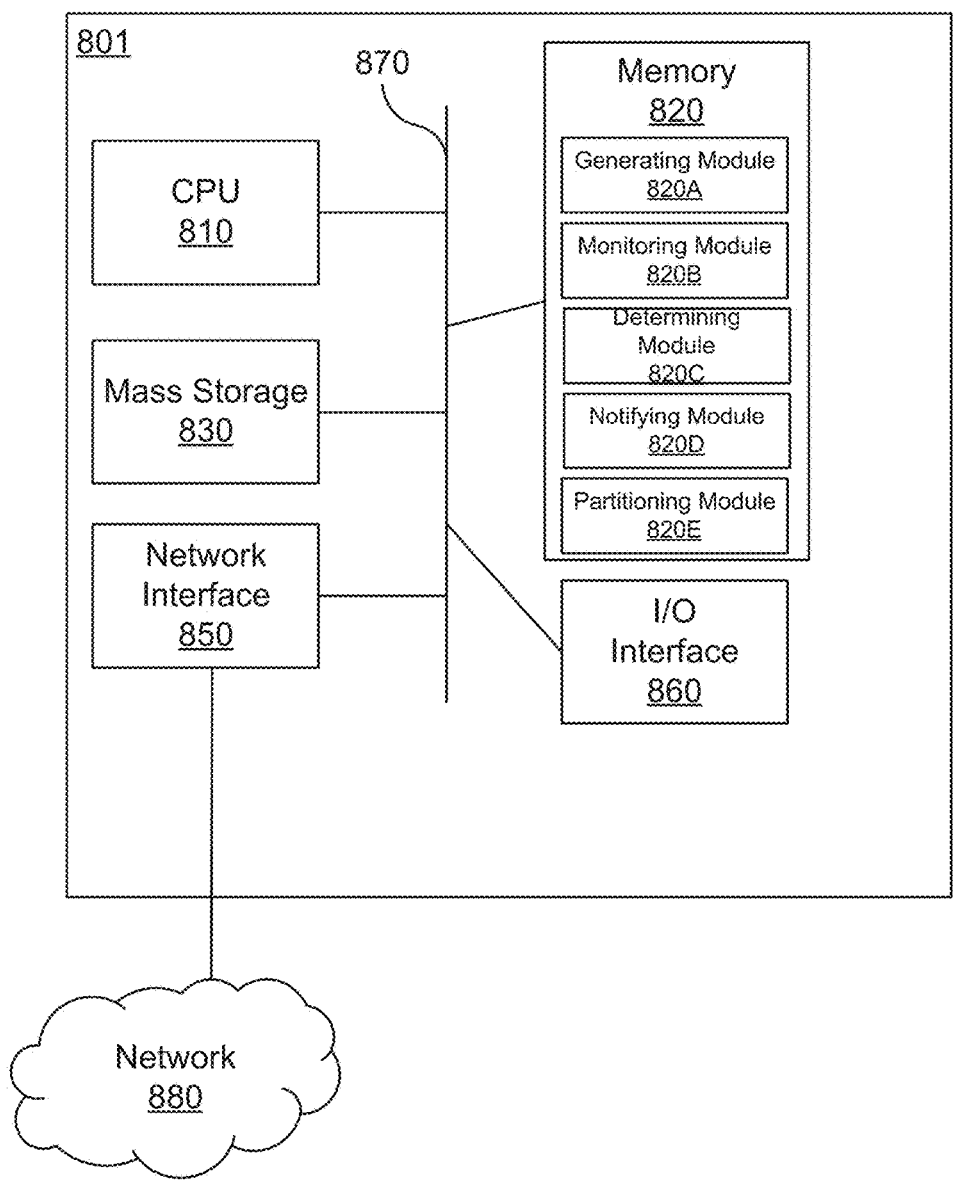
FIG. 8 illustrates a block diagram of a network system that can be used to implement various embodiments.

FIG. 8 is a block diagram of a network device 800 that can be used to implement various embodiments. Specific network devices may utilize all of the components shown, or only a subset of the components, and levels of integration may vary from device to device. Furthermore, the network device 800 may contain multiple instances of a component, such as multiple processing units, processors, memories, transmitters, receivers, etc. The network device 800 may comprise a processing unit 801 equipped with one or more input/output devices, such as network interfaces, storage interfaces, and the like. The processing unit 801 may include a central processing unit (CPU) 810, a memory 820, a mass storage device 830, and an I/O interface 860 connected to a bus 870. The bus 870 may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. In one embodiment, the memory 820 includes a generating module 820A generating multiple circular shaped geofences to cover a geographic region defined by a polygon shaped geofence, a monitoring module 820B monitoring the multiple circular shaped geofences to detect a current location of user equipment entering a boundary of any of the circular shaped geofences, a determining module 820C determining and based on the detection, that the current location of the user equipment is within the polygon shaped geofence, a notifying module 820D notifying a location based-service that the user equipment has entered the polygon shaped geofence, and a portioning module 820E portioning the polygon shaped geofence into one or more sub-regions, where each of the sub-regions is covered by a corresponding one of the multiple circular geofences.

The mass storage device 830 may comprise any type of storage device configured to store data, programs, and other information and to make the data, programs, and other information accessible via the bus 870. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and nonvolatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for geofencing, comprising:
    generating, by a computing device, a number of multiple circular shaped geofences to cover a geographic region defined by a polygon shaped geofence;
    adjusting the number of the multiple circular shaped geofences based on a quality threshold to cover the polygon shaped geofence;
    monitoring, by the computing device, the multiple circular shaped geofences to detect a current location of the user equipment entering a boundary of any of the circular shaped geofences;
    determining, by the computing device and based on the detection, that the current location of the user equipment is within the polygon shaped geofence; and
    notifying a location based service that the user equipment has entered the polygon shaped geofence;
    wherein adjusting the amount of the number of the multiple circular shaped geofences further comprises:
        measuring, by the computing device, the quality threshold of the multiple circular shaped geofences by calculating a difference between an area of the geographic region covered by the polygon shaped geofence and an area of the geographic region covered by the multiple circular shaped geofences;
        defining, by the computing device, a baseline threshold;
        generating, by the computing device, interpolation points that lie inside of the polygon shaped geofence;
        calculating, by the computer device, a minimum number of the multiple circular geofences to generate the multiple circular geofences based on the generated interpolation points; and
        evaluating, by the computing device, the quality threshold of the multiple circular geofences to determine whether the baseline threshold has been satisfied;
            in response to the quality threshold being greater than the baseline threshold, adjusting, by the computing device, the minimum number and generating the multiple circular geofences based on the adjusted minimum number, and
            in response to the quality threshold being less than or equal to the baseline threshold, generating, by the computing device, the minimum number of the multiple circular geofences to cover the polygon shaped geofence.

2. The method of claim 1, further comprising:
    partitioning, by the computing device, the polygon shaped geofence into one or more sub-regions, where each of the sub-regions is covered by a corresponding one of the multiple geofences.

3. The method of claim 1, wherein generating the interpolation points comprises:
    filling, by the computing device, the geographic region with independent points;
    interpolating, by the computing device, the independent points into the polygon shaped geofence defining the geographic region.

4. The method of claim 3, further comprising:
    partitioning, by the computing device, the interpolated independent points into sub-regions where each sub-region is covered by one of the multiple circular shaped geofences.

5. The method of claim 1, wherein calculating the minimum number of the multiple circular geofences comprises:
    calculating, by the computing device, initial center points of the multiple circular shaped geofences as the points that divide the polygon shaped geofence into the minimum number of equal parts in one direction;
    partitioning, by the computing device, the interpolated points into a minimum number of clusters and creating a single circular shaped geofence around the points in each of the clusters; and
    merging, by the computing device, the multiple circular shaped geofences, to reduce a total of the amount of the number of the multiple circular shaped geofences, in response to more than one of the multiple circular shaped geofences located inside of the polygon shaped geofence.

6. The method of claim 1, wherein determining that the current location of the user equipment is within the polygon shaped geofence further comprises:
    retrieving, by the computing device, position and accuracy information that defines a circular region surrounding a location of the user equipment;

calculating, by the computing device, distances between the position and each edge of the polygon shaped geofence;

in response to the distances being greater than or equal to the accuracy, determining, by the computing device, whether the position is inside or outside of the polygon shaped geofence; and in response to at least one of the distances being less than the accuracy, determining, by the computing device, that an overlay exists between the circular region and the polygon shaped geofence.

7. The method of claim 6, wherein in response to the distances being less than the accuracy:

generating, by the computing device, M points interpolated in the circular region;

identifying, by the computing device, N points that are inside of the circular region and the polygon shaped geofence; and calculating, by the computing device, a probability that the user equipment is located inside of the polygon shaped geofence as N/M, wherein N approximates a size of an overlay area between the circular region and the polygon shaped geofence, and M approximates a size of the area of the circular region.

8. The method of claim 1, wherein the location based service is an application, a navigation system or a system providing information based on the current location of the user equipment.

9. A device, comprising:

a non-transitory memory storage comprising instructions; and one or more processors in communication with the memory, wherein the one or more processors execute the instructions to:

generate multiple circular shaped geofences to cover a geographic region defined by a polygon shaped geofence;

adjust a number of the multiple circular shaped geofences to cover the polygon shaped geofence;

monitor the multiple circular shaped geofences to detect a current location of user equipment entering a boundary of any of the circular shaped geofences;

determine, based on the detection, that the current location of the user equipment is within the polygon shaped geofence; and notify a location based service that the user equipment has entered the polygon shaped geofence;

wherein adjusting the amount of the number of the multiple circular shaped geofences further causes the one or more processors to execute the instructions to measure the quality threshold of the multiple circular shaped geofences by calculating a difference between an area of the geographic region covered by the multiple circular shaped geofences;

define a baseline threshold;

generate interpolation points that each lie inside of the polygon shaped geofence;

calculate a minimum number of the multiple circular geofences to generate the multiple circular geofences based on the generated interpolation points; and evaluate the quality threshold of the multiple circular geofences to determine whether the baseline threshold has been satisfied;

in response to the quality threshold being greater than the baseline threshold, adjust the minimum number and generating the multiple circular geofences based on the adjusted minimum number, and in response to the quality threshold being less than or equal to the baseline threshold, generate the minimum number of the multiple circular geofences to cover the polygon shaped geofence.

10. The device of claim 9, the one or more processors further execute the instructions to partition the polygon shaped geofence into one or more sub-regions, where each of the sub-regions is covered by a corresponding one of the multiple circular geofences.

11. The device of claim 9, wherein calculating the minimum number of the multiple circular geofences further causes the one or more processors to execute the instructions to:

calculate initial center points of the multiple circular shaped geofences as the points that divide the polygon shaped geofence into the minimum number of equal parts in one direction;

partition the interpolated points into a minimum number of clusters and create a single circular shaped geofence around the points in each of the clusters; and merge the multiple circular shaped geofences, to reduce a total of the amount of the number of the multiple circular shaped geofences, in response to more than one of the multiple circular shaped geofences located inside of the polygon shaped geofence.

12. The device of claim 9, wherein determining that the current location of the user equipment is within the polygon shaped geofence further causes the one or more processors to execute the instructions to:

retrieve position and accuracy information that defines a circular region surrounding a location of the user equipment;

calculate distances between the position and each edge of the polygon shaped geofence;

in response to the distances being greater than or equal to the accuracy, determine, whether the position is inside or outside of the polygon shaped geofence; and in response to at least one of the distances being less than the accuracy, determine that an overlay exists between the circular region and the polygon shaped geofence.

13. The device of claim 12, wherein in response to the distances being less than the accuracy, further causing the one or more processors to execute the instructions to:

generate M points interpolated in the circular region;

identify N points that are inside of the circular region and the polygon shaped geofence; and calculate a probability that the user equipment is located inside of the polygon shaped geofence as N/M, wherein N approximates a size of an overlay area between the circular region and the polygon shaped geofence, and M approximates a size of the area of the circular region.

14. A non-transitory computer-readable medium storing computer instructions for geofencing, that when executed by one or more processors, cause the one or more processors to perform:

generating, by a computing device, multiple circular shaped geofences to cover a geographic region defined by a polygon shaped geofence;

adjusting a number of the multiple circular shaped geofences based on a quality threshold to cover the polygon shaped geofence;

monitoring, by the computing device, the multiple circular shaped geofences to detect a current location of user equipment entering a boundary of any of the circular shaped geofences;

determining, by the computing device and based on the detection, that the current location of the user equipment is within the polygon shaped geofence; and notifying a location based service that the user equipment has entered the polygon shaped geofence;

wherein adjusting the amount of the number of the multiple circular shaped geofences further comprises:

measuring, by the computing device, the quality threshold of the multiple circular shaped geofences by calculating a difference between an area of the geographic region covered by the polygon shaped geofence and an area of the geographic region covered by the multiple circular shaped geofences;

defining, by the computing device, a baseline threshold;

generating, by the computing device, interpolation points that lie inside of the polygon shaped geofence;

calculating, by the computer device, a minimum number of the multiple circular geofences to generate the multiple circular geofences based on the generated interpolation points; and evaluating, by the computing device, the quality threshold of the multiple circular geofences to determine whether the baseline threshold has been satisfied;

in response to the quality threshold being greater than the baseline threshold, adjusting, by the computing device, the minimum number and generating the multiple circular geofences based on the adjusted minimum number, and in response to the quality threshold being less than or equal to the baseline threshold, generating, by the computing device, the minimum number of the multiple circular geofences to cover the polygon shaped geofence.

15. The non-transitory computer-readable medium of claim 14, cause the one or more processors to further perform:

partitioning the polygon shaped geofence into one or more sub-regions, where each of the sub-regions is covered by a corresponding one of the multiple circular geofences.

16. The non-transitory computer-readable medium of claim 14, wherein determining that the current location of the user equipment is within the polygon shaped geofence causes the one or more processors to perform:

retrieve position and accuracy information that defines a circular region surrounding a location of the user equipment;

calculate distances between the position and each edge of the polygon shaped geofence;

in response to the distances being greater than or equal to the accuracy, determine whether the position is inside or outside of the polygon shaped geofence; and in response to at least one of the distances being less than the accuracy, determine that an overlay exists between the circular region and the polygon shaped geofence.

* * * * *